US007757251B2

(12) United States Patent
Gonder et al.

(10) Patent No.: US 7,757,251 B2
(45) Date of Patent: Jul. 13, 2010

(54) TECHNIQUE FOR PROVIDING PROGRAM GUIDE DATA THROUGH A COMMUNICATIONS NETWORK DELIVERING PROGRAMMING CONTENT

(75) Inventors: Thomas L. Gonder, Westminster, CO (US); David G. Bell, Superior, CO (US); Russell L. Greenlee, Boulder, CO (US); John A. Stebbins, Golden, CO (US)

(73) Assignee: Time Warner Interactive Video Group Inc., Stamford, CT (US)

( * ) Notice: Subject to any disclaimer, the term of this patent is extended or adjusted under 35 U.S.C. 154(b) by 1405 days.

(21) Appl. No.: 10/390,963

(22) Filed: Mar. 18, 2003

(65) Prior Publication Data

US 2004/0187150 A1 Sep. 23, 2004

(51) Int. Cl.
*H04N 5/445* (2006.01)
(52) U.S. Cl. .............................. 725/39; 725/43; 725/44; 725/51; 725/54; 725/59
(58) Field of Classification Search ............... 725/39–53
See application file for complete search history.

(56) References Cited

U.S. PATENT DOCUMENTS

| 5,585,838 | A | * | 12/1996 | Lawler et al. | 725/54 |
| 5,600,364 | A | * | 2/1997 | Hendricks et al. | 725/9 |
| 6,263,501 | B1 | * | 7/2001 | Schein et al. | 725/39 |
| 6,317,885 | B1 | * | 11/2001 | Fries | 725/109 |
| 6,442,755 | B1 | * | 8/2002 | Lemmons et al. | 725/47 |
| 6,481,012 | B1 | * | 11/2002 | Gordon et al. | 725/54 |

(Continued)

OTHER PUBLICATIONS

Program and System Information Protocol for Terrestrial Broadcast and Cable, Dec. 23, 1997, Advance Television System Committee, Doc A/65.*

*Primary Examiner*—Son P Huynh
(74) *Attorney, Agent, or Firm*—Straub & Pokotylo; Michael P. Straub

(57) ABSTRACT

In order to efficiently utilize the limited transmission bandwidth of a communications network, e.g., a cable network, guide data for constructing an interactive program guide (IPG) is delivered to a set-top terminal using different methodologies. For example, the guide data associated with those programs which are likely of interest to a user is automatically provided piecemeal in a broadcast stream. The set-top terminal, along with other terminals, may retrieve from such a broadcast stream some or all of the guide data therein over time, which is cached in the terminal in anticipation of a user's invocation of an IPG. On the other hand, the guide data associated with those programs which are less likely of interest to a user is furnished upon request by the set-top terminal needing such guide data to realize an IPG desired by the user. In addition, guide data for each program may be divided into detail guide data providing details of the program (e.g., a synopsis of the program content), and grid guide data providing basic information about the program (e.g., title, channel and broadcast time). A first time window and a second time window may be defined such that the grid guide data associated with those programs broadcast within the first time window and the detail guide data associated with those programs broadcast within the second time window are automatically provided in the broadcast stream. The rest of the detail and grid guide data may be furnished upon request when needed.

18 Claims, 10 Drawing Sheets

U.S. PATENT DOCUMENTS

| | | | |
|---|---|---|---|
| 6,536,041 B1 * | 3/2003 | Knudson et al. | 725/39 |
| 6,631,523 B1 * | 10/2003 | Matthews et al. | 725/53 |
| 6,700,624 B2 * | 3/2004 | Yun | 348/555 |
| 6,751,401 B1 * | 6/2004 | Arai et al. | 386/83 |
| 6,915,528 B1 * | 7/2005 | McKenna, Jr. | 725/37 |
| 6,973,667 B2 * | 12/2005 | Fritsch | 725/88 |
| 7,000,245 B1 * | 2/2006 | Pierre et al. | 725/136 |
| 7,028,331 B2 * | 4/2006 | Schwalb | 725/140 |
| 7,032,236 B1 * | 4/2006 | Ozkan et al. | 725/39 |
| 7,051,361 B1 * | 5/2006 | Kim et al. | 725/139 |
| 7,150,029 B1 * | 12/2006 | Ebling et al. | 725/39 |
| 2001/0013127 A1 * | 8/2001 | Tomita et al. | 725/58 |
| 2002/0035726 A1 * | 3/2002 | Corl | 725/39 |
| 2002/0059623 A1 * | 5/2002 | Rodriguez et al. | 725/91 |
| 2002/0059642 A1 * | 5/2002 | Russ et al. | 725/135 |
| 2002/0176372 A1 * | 11/2002 | Ichikawa et al. | 370/254 |
| 2003/0018748 A1 * | 1/2003 | McKenna, Jr. | 709/219 |
| 2003/0066085 A1 * | 4/2003 | Boyer et al. | 725/104 |
| 2004/0117831 A1 * | 6/2004 | Ellis et al. | 725/53 |
| 2006/0212908 A1 * | 9/2006 | Hunter et al. | 725/70 |

* cited by examiner

FIG. 3
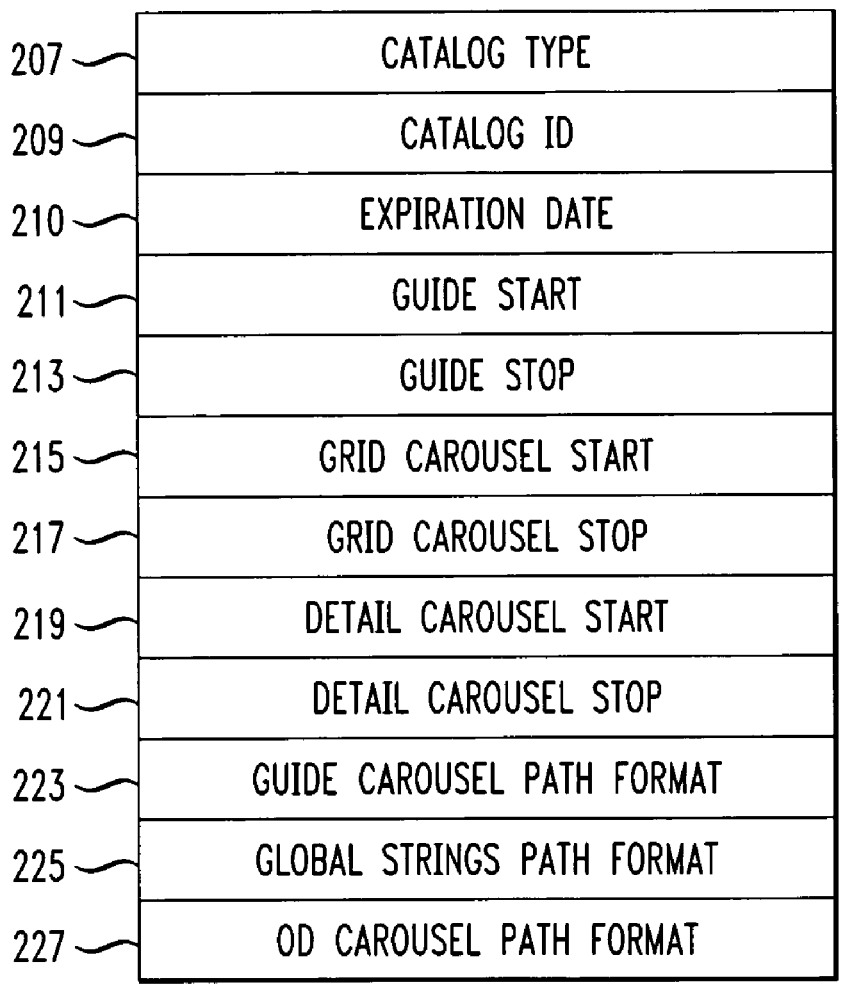
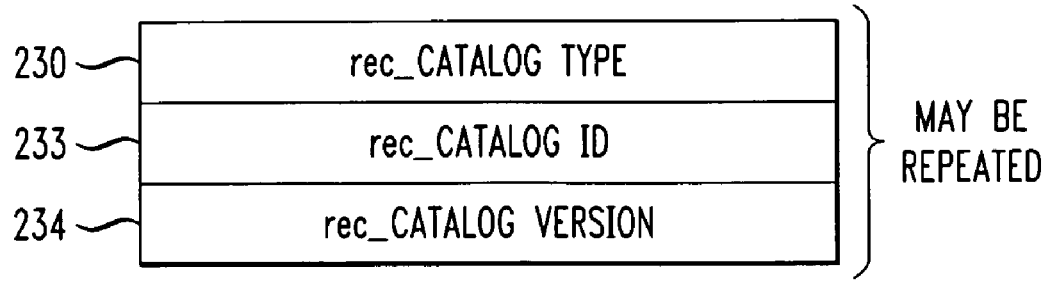

FIG. 5
400
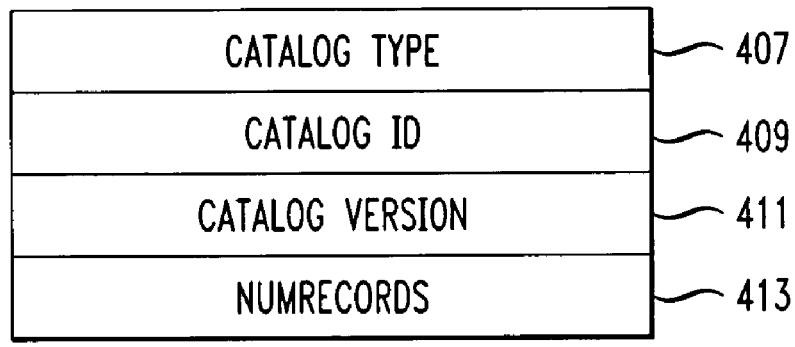
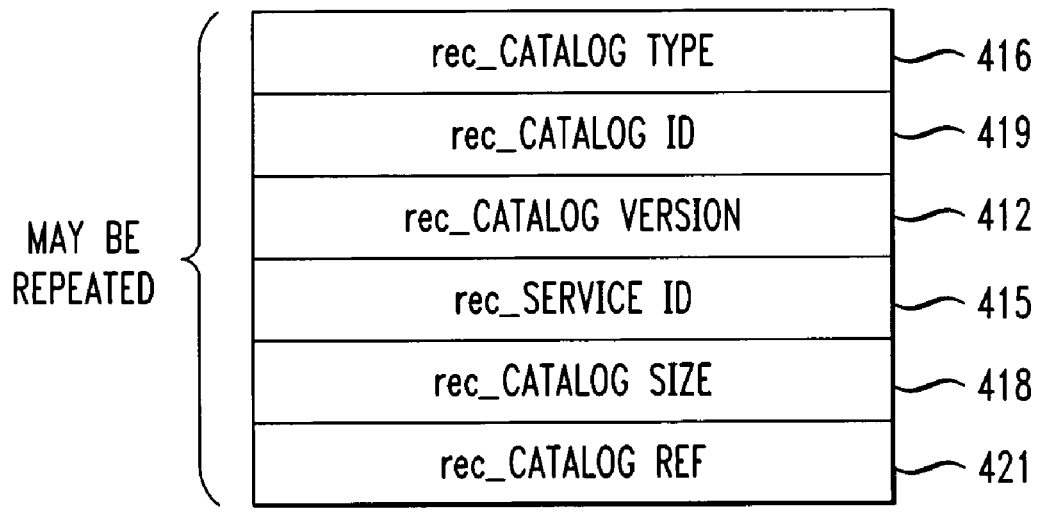

Start Date: Monday, August 5, 2002 7:00:00 PM MDT

| TIME | SHOW | DESCRIPTION | DURATION | ADVISORY RATING |
|---|---|---|---|---|
| HBO 903 { 905 { Mon Aug 05 19:00:00 MDT 2002 | Curb Your Enthusiasm | 907 { Curb Your Enthusiasm 911 { Richard Lewis sidetracks Larry's trip to the drug store. | 913 { 30 | 915 { TV-14 |
| 917 { Mon Aug 05 19:30:00 MDT 2002 | Curb Your Enthusiasm | Curb Your Enthusiasm Larry's buxom former flame inflames Cheryl's jealousy. | 35 | TV-14 |
| Mon Aug 05 20:05:00 MDT 2002 | Snatch | Snatch Criminals and con artists fight over a jewel. | 145 | TV-14 |
| Mon Aug 05 22:30:00 MDT 2002 | Two Can Play That Game | Two Can Play That Game A woman (Vivica A. Fox) claims to have complete control over her boyfriend (Morris Chestnut). | 145 | R |
| | | . . . | | |

1301

TECHNIQUE FOR PROVIDING PROGRAM GUIDE DATA THROUGH A COMMUNICATIONS NETWORK DELIVERING PROGRAMMING CONTENT

TECHNICAL FIELD

The invention relates generally to a communications system and method and, more particularly, to a system and method for providing programming content and program guide data concerning the programming content through a communications network, e.g., a cable network.

BACKGROUND OF THE INVENTION

Use of a cable network to deliver programming content, e.g., TV programs, is ubiquitous. The cable network terminates on set-top boxes at the user premises. It is well known that the cable network also provides program guide data to the set-top boxes from time to time. The program guide data typically contains broadcast time and channel information concerning each program to be broadcast within a predetermined period. The program guide data may be used to populate an interactive program guide (IPG) facilitating a user's access to desired programs. After receiving the program guide data from the cable network, the set-top box stores it in a memory therein, which is updated to provide the latest IPG.

Nowadays, the number of program channels and the amount of programming content delivered over a cable network are ever increasing. At the same time, the number and types of cable services, e.g., video-on-demand (VOD) services, introduced to enhance a user's program enjoyment are ever growing. As a consequence, the amount of program guide data concerning broadcast programs, on-demand programs, etc. which needs to be transmitted to set-top boxes is also ever increasing. In prior art, the limited bandwidth of the cable network for transmitting program guide data is no longer sufficient for effectively transmitting the increasing guide data. Similarly, in prior art, the limited memory capacity of a set-top box is no longer sufficient for accommodating the increasing guide data.

SUMMARY OF THE INVENTION

The invention overcomes the prior art limitations by effectively utilizing the limited bandwidth of a communications network for providing program guide data, and allowing a set-top terminal to dynamically maintain an amount of guide data therein according to its memory capacity. In accordance with the invention, data objects (e.g., catalogs) are used to convey program guide data over the communications network. A first period associated with a first data object and a second period associated with a second data object are defined. For instance, the first data object contains basic grid guide data concerning at least one program, e.g., the program title, broadcast time and channel information, while the second data object contains detailed guide data concerning the same, e.g., a summary of the program content. The first data object is broadcast over the communications network if the delivery time of the program is within the first period, and the second data object is broadcast over the communications network if the delivery time of the program is within the second period.

In an illustrative embodiment, data objects, when broadcast, are disseminated in a broadcast stream receivable by set-top terminals. For example, a user may be more likely interested in learning about programs to be broadcast within a day or two than any other time. In accordance with an aspect of the invention, data objects associated with such recent programs are automatically disseminated through the broadcast stream as they are of more interest to a user. The aforementioned first and second periods are used to define the "recentness" of such programs, and also regulate the automatic disseminations of the associated grid guide data and detailed guide data, respectively. A set-top terminal may be programmed to read and store some or all of the data objects in the broadcast stream depending on its memory capacity. The priority in storing particular data objects varies with how likely the programs with which the data objects are associated are of interest to a user, or in other words how likely the user will access the guide data in those data objects. Any data objects which are not stored in a set-top terminal but are needed for constructing a program guide are furnished upon request therefor, which entails two-way communications between the set-top terminal and a guide data server.

In accordance with another aspect of the invention, multiple data objects may be linked to one another for constructing, e.g., a menu for program selection. Some of such data objects may be broadcast over the communications network while the others may be furnished upon request therefor, depending on, again, how likely the data in the data objects are to be accessed. That is, those data objects whose data is more likely accessed by the user are automatically disseminated in a broadcast stream while the others are provided on an as needed basis.

To more effectively utilize the limited communications network bandwidth and memory capacity of a set-top terminal, a repetitive string descriptive of a program, e.g., a program title, in a program guide, may be represented by a code in a data object containing guide data when transmitted to the set-top terminal. In accordance with yet another aspect of the invention, the code includes an indication whether the string is a local string located in the same data object or a global string which may be located using a global string table outside the data object.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

FIG. 3 illustrates a data structure of a profile used by the set-top terminal for receiving the program guide and related data;

FIG. 5 illustrates a data structure of a group catalog containing program guide and related data;

FIG. 10 illustrates a sample program guide;

DETAILED DESCRIPTION

Figure 1:
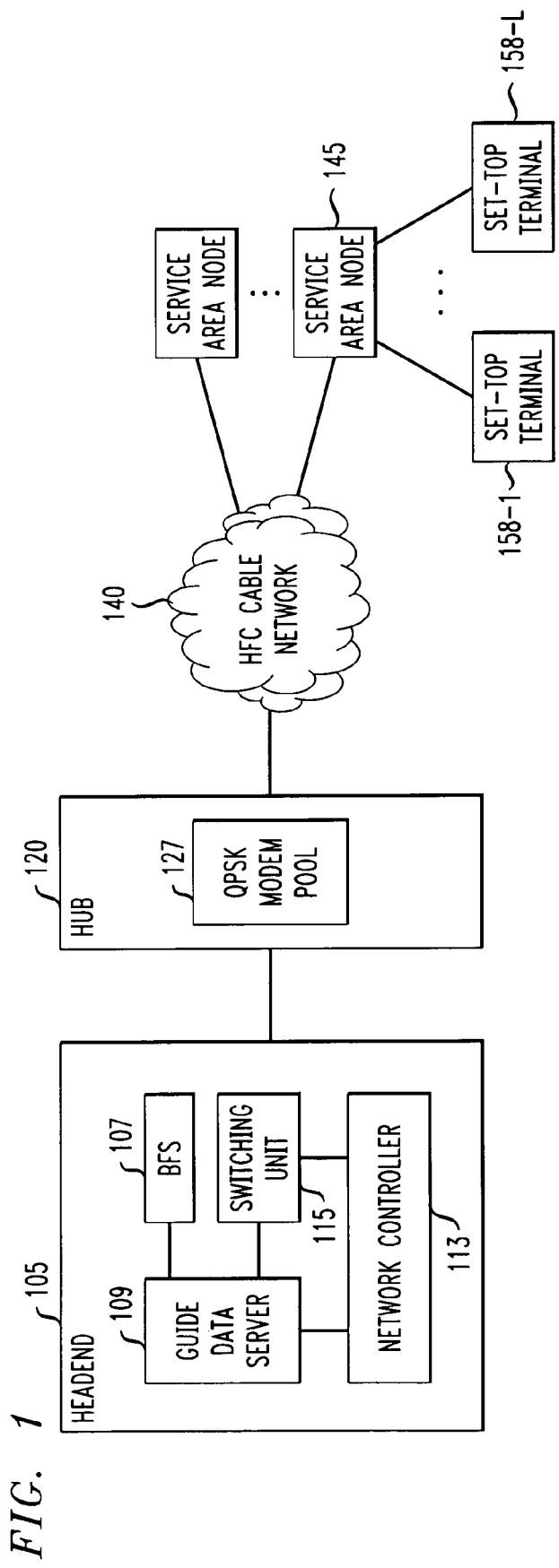
FIG. 1 illustrates a portion of a broadband communications system in which program guide and related data is provided to set-top terminals in accordance with the invention.

The invention is directed to delivery of entertainment programming content, e.g., TV programs, and program guide data concerning the programming content to a user terminal over a two-way communications multichannel network, e.g., a cable network. Because of the deployment of ever increasing program channels and video-on-demand (VOD) services such as movie-on-demand (MOD) and subscription VOD services over a cable network, the network bandwidth currently allocated for transmitting program guide data to user terminals can no longer meet the need of transmitting ever increasing program guide data, concerning broadcast programs, VOD programs, etc. Nor can the limited capacity of a memory in a user terminal accommodate the same.

The ever increasing program guide data is, in part, attributed to an effort to provide "detail" guide information, in addition to the traditional "grid" information, about each program to allow the user to make a more informed program selection. The "grid" information concerning a program refers to such information as the title of the program, the time when the program is broadcast, the program channel on which the program is available, etc. for building a traditional "grid" interactive program guide (IPG). The "detail" guide information concerning a program refers to such supplementary information as a synopsis or summary of the program content, etc.

The ever increasing program guide data is also attributed to the fact that the user is provided with not only guide data concerning programs to be broadcast, but also previously broadcast programs. In particular, the guide data for previously broadcast programs facilitates a user's selection for review of one such program, in accordance with a headend based network personal video recorder (NPVR) service feature. This service feature is fully described, for example, in copending, commonly assigned U.S. application Ser. No. 10/302,550 filed on Nov. 22, 2002, which is hereby incorporated by reference. The NPVR service feature should be distinguished from the function performed by a traditional digital video recorder (DVR), e.g., a TiVo or ReplayTV device, co-locating with the user terminal. For example, in accordance with the NPVR service feature, broadcast programs are recorded at a headend of a cable network while they are being delivered to a user terminal. The user may select for review previously broadcast programs since they have been recorded at the headend regardless of any user request. In addition, by removing the program recording function from a traditional DVR, which is a local device, to the network, the user no longer needs to be bothered with the local device (or its remote control for that matter), and may also reserve or select programs having overlapping broadcast times. Thus, with the NPVR service feature, a user can enjoy any desired programs anytime, thereby transcending traditional program schedule limitations. For a user's convenience, a user here is allowed to navigate the IPG not only forward, but also backward in time to access previously broadcast programs up to a predetermined period in the past.

In accordance with the invention, multiple methodologies are used for providing guide data to a user terminal to realize an IPG, and use of a particular methodology depends on how likely the programs associated with the guide data are of interest to the user. For example, a user may be more interested in learning about the broadcast programs of the current day and the day after than any other time. The user may also be likely interested in learning about the programs broadcast on the previous day, and perhaps for some reason missed their broadcast, but would like to review them. In general, the user's interest in learning about a program is inversely proportional to the time between its broadcast and the current time. That is, the longer the time between its broadcast and the current time is, the less the user interested in learning about the program. By taking advantage of this observation, in an embodiment of the invention the guide data concerning the broadcast programs on, e.g., the current day and the day before and after, is provided automatically to a user terminal from time to time, e.g., periodically. The remaining guide data, however, may be provided to a user terminal on an as needed basis. That is, the user terminal may need to issue a request for such guide data when a user tries to access it on the IPG, thus requiring two-way communications, i.e., a terminal request in an upstream direction and a network response with the requested guide data in a downstream direction. In addition, even for the guide data which is automatically provided to a user terminal, it may not comprise both grid information and the corresponding detail guide information. For example, for those broadcast programs on the current day and the day after which are of the most interest to a user, both grid and detail guide information about the programs are automatically provided. However, for example, for those programs broadcast on the previous day which are of interest to a user to a lesser extent, only the grid information about the programs is automatically provided, and the corresponding detail guide information is provided upon request therefor.

FIG. 1 illustrates a portion of a broadband communications system, e.g., a cable system, embodying the principles of the invention which is relevant to communication of guide data from headend 105 to set-top terminals at the user premises. As shown in FIG. 1, the broadband communications system includes headend 105, hub 120, hybrid fiber coaxial (HFC) cable network 140, and service area node 150 which is connected to set-top terminals 158-1 through 158-L in a neighborhood, where L is a predetermined number.

Figure 2:
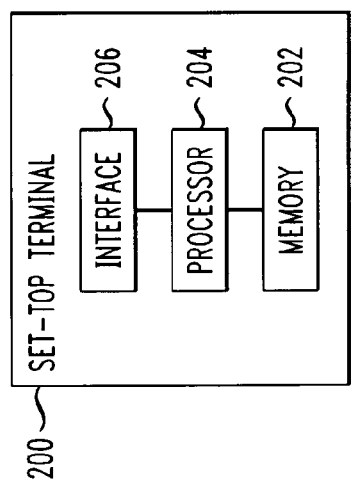
FIG. 2 is a block diagram of a set-top terminal.

FIG. 2 illustrates set-top terminal 200, generically representing one of set-top terminals 158-1 through 158-L. As shown in FIG. 2, terminal 200 comprises memory 202 which includes a cache, and processor 204 for orchestrating operations of terminal 200, including, e.g., updating guide data stored in memory 202, and initiating requests for guide data which is not available in memory 202, in accordance with the invention.

In this instance, programming content including the content of broadcast programs, NPVR programs and VOD programs are provided from headend 105 to set-top terminals through transmission channels. These transmission channels may be 6 MHz bands populating a forward passband, e.g., 350-750 MHz band, of a coaxial cable, which is allocated for downstream communication from headend 105 to a set-top terminal. It should be noted at this point that the term "transmission channel" should not be confused with a "program channel." A "transmission channel" signifies a designated frequency band through which a transport stream containing broadcast programs is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc.

Upstream data from a set-top terminal to headend 105 may be communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 113 are identified by the Internet protocol (IP) addresses assigned thereto. However, these IP addresses may be randomly assigned each time when the broadband communication system is reconfigured. As a result, the IP address of a set-top terminal or controller 113 may change after a system reconfiguration. Nevertheless, each of set-top terminals and controller 113 is also assigned a media access control (MAC) address on a permanent basis, surviving any system reconfiguration.

Downstream data from headend 105 to a set-top terminal may be communicated via forward data channels (FDCs). These channels, often referred to as "out-of-band" channels, may occupy the 70-130 MHz band of a coaxial cable. For example, QPSK signals containing system messages to a set-top terminal are transmitted through an FDC having a 1 MHz bandwidth. It should be noted that the 1 MHz bandwidth allocated for an FDC here is for illustrative purposes only.

In accordance with the invention, a subset of the program guide data from server 109, especially those which are likely accessed by a user, is broadcast to set-top terminals using broadcast file system (BFS) 107 of conventional design. BFS 107 in this instance allows a set-top terminal to read guide data related files or catalogs from a broadcast stream as if they were local catalogs. The broadcast stream is modulated using a designated QPSK modem in pool 127 onto an out-of-band channel. In general, BFS 107 is used to "trickle," or disseminate piecemeal, guide data related catalogs to set-top terminals, which then assemble the guide data to build their own cache for an IPG. To that end, BFS 107 applies a well known "data carousel" mechanism for periodically providing catalogs onto the broadcast stream to the set-top terminals. Depending on the capacity of its cache, each set-top terminal may be programmed differently to read from the broadcast stream some or all of the catalogs in the broadcast stream and store an amount of guide data corresponding to its cache capacity. The priority in reading particular catalogs is given to those catalogs containing guide data associated with programs which are more likely of interest to a user. For those guide data which are not cached and which are necessary for constructing an IPG desired by the user, the set-top terminal needs to issue a request for such guide data to headend 105 in a manner described below.

In accordance with an aspect of the invention, a profile is provided by BFS 107 in the broadcast stream which each set-top terminal is required to read initially in each period. The profile, also referred to as a "genesis" catalog, may be used by a set-top terminal to reconcile its guide data with server 109.

In addition, the profile may be used by a set-top terminal to determine the time-windows (also referred to as "carousel windows") of guide data available in the broadcast stream, and to locate the grid and detail catalogs (described below) within the respective time-windows in the broadcast stream. FIG. 3 illustrates the data structure of a profile, denoted 203. As shown in FIG. 3, profile 203 includes, e.g., Catalog Type field 207 which contains an identifier indicating that the instant catalog is of profile type; Catalog ID field 209 which, together with Catalog Type field 207, uniquely identifies the instant profile in the system; Expiration Date field 210 which specifies the time when the instant profile is no longer valid, or when a set-top terminal should read a new profile; Guide Start field 211 which specifies the start time of a total guide data window; Guide Stop field 213 which specifies the end time of the total guide data window; Grid Carousel Start field 215 which specifies the start time of a grid carousel window; Grid Carousel Stop field 217 which specifies the end time of the grid carousel window; Detail Carousel Start field 219 which specifies the start time of a detail carousel window; Detail Carousel Stop field 221 which specifies the end time of a detail carousel window; Guide Carousel Path Format field 223 which specifies the root path of a directory for grid/detail guide catalogs; Global Strings Path Format field 225 which specifies the root path of a directory for global strings group catalogs; and OD Carousel Path Format field 227 which specifies the root path of a directory for on-demand menu and selection catalogs.

Profile 203 also lists all other catalogs that are available and their current version numbers, thereby allowing set-top terminal 200 to determine any outdated catalogs which need to be replaced by their current versions in memory 202. Thus, for each of such catalogs, profile 203 also includes, e.g., rec_Catalog Type field 230 which specifies the type of the catalog, e.g., detail catalog, grid catalog, etc.; rec_Catalog ID field 233 which, together with rec_Catalog Type field 230, uniquely identifies the catalog; and rec_Catalog Version field 234 which specifies the current version number of the catalog. Thus, by parsing profile 203, processor 204 in set-top terminal 200 can determine which catalogs are outdated, thereby allowing the terminal to discard those outdated catalogs, and reload their current versions.

Figure 4:
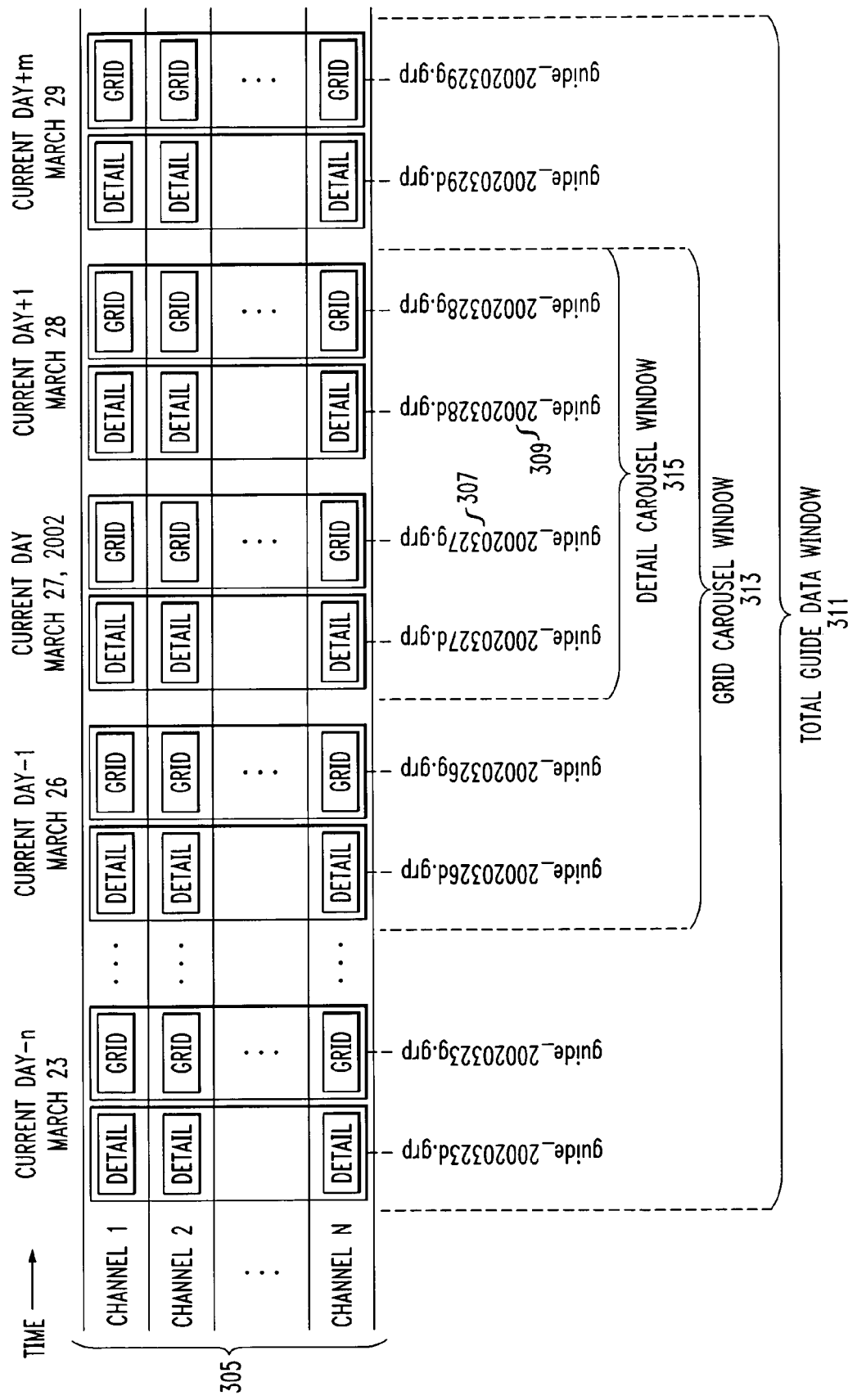
FIG. 4 illustrates guide data windows specified by the profile.

FIG. 4 illustrates guide data windows which are defined by certain fields of profile 203, and which are mapped to a representative program guide, denoted 305. As illustrated in FIG. 4, guide 305 includes guide data concerning programs broadcast on program channels 1 through N on a daily basis, ranging from (current day−n) to (current day+m), where N, n and m represent integers, respectively. The maximum time range of guide 305 for which guide data can be provided by server 109 is defined by Total Guide Data Window 311, delimited by the times specified in Guide Start field 211 and Guide Stop field 213, respectively. That is, in this instance only guide data within window 311 can be made available by server 109 either in a BFS broadcast stream or upon request. Other windows include Grid Carousel Window 313, delimited by the times specified in Grid Carousel Start field 215 and Grid Carousel Stop field 217, respectively; and Detail Carousel Window 315, delimited by the times specified in Detail Carousel Start field 219 and Detail Carousel Stop field 221, respectively. As mentioned before, the guide data comprises grid information and detail guide information. In accordance with the invention, only detail guide information within window 315 is automatically disseminated and broadcast through the BFS broadcast stream. In this example, detail guide information concerning programs delivered on the current day and the day after (i.e., current day+1) within window 315 is automatically made available on the BFS broadcast stream. Any detail guide information outside window 315 needs to be requested by set-top terminal 200.

Similarly, only grid information within grid carousel window 313 is automatically disseminated and broadcast through the BFS broadcast stream. In this example, grid information concerning programs delivered on the current day, the day before (i.e., current day−1) and after (i.e., current day+1) within window 313 is automatically made available on the BFS broadcast stream. Any grid information outside window 313 needs to be requested by set-top terminal 200.

In this instance, the grid information concerning programs available on channels 1 through N is collectively included in a daily grid group catalog, e.g., group catalog 307 (guide_20020327g.grp) containing such collective grid information associated with the same day (Mar. 27, 2002). Similarly, the detail guide information concerning programs available on channels 1 through N is collectively included in a daily detail group catalog, e.g., group catalog 309 (guide_20020327d.grp) containing such collective detail guide information associated with the same day (Mar. 27, 2002).

Thus, profile 203 defines how far ahead, behind and which catalogs are available in a BFS broadcast stream. For each day, profile 203 is updated to reflect the shift in the daily catalog windows. The Grid and Detail Carousel Windows are intended to allow set-top terminal 200 to passively retrieve guide data without impacting the network. As a background process, set-top terminal 200 can listen for catalogs and build up its cache with the guide data most likely to be browsed.

FIG. 5 illustrates the data structure of a generic group catalog, denoted 400. Catalog 400 includes, e.g., Catalog Type field 407 which contains an identifier indicating that the instant catalog is of grid catalog type; Catalog ID field 409 which, together with Catalog Type field 407, uniquely identifies the instant catalog in the system; Catalog Version field 411 which contains a version number of the instant catalog, which is incremented for each published change to the catalog; NumRecords field 413 which contains the number of records which reside in the instant catalog. Let's say catalog 400 is a grid (detail) group catalog, e.g., grid group catalog 309 (detail group catalog 307). In this example, each record further identifies a grid (detail) catalog containing grid (detail) information about a broadcast program on one of the N program channels. Thus, the number of the records in catalog 309 (307) is N in this instance.

For each grid (detail) catalog, group catalog 400 also includes, e.g., rec_Catalog Type field 416 which contains an identifier indicating that the instant catalog is of grid (detail) catalog type; rec_Catalog ID field 419 which, together with rec_Catalog Type field 416, uniquely identifies the instant catalog in the system; rec_Catalog Version field 412 which contains a version number of the instant grid (detail) catalog, which is incremented for each published change to the catalog; rec_Service ID field 415 which identifies the program channel, e.g., CBS, ESPN, MTV, etc., with which the instance grid (detail) catalog is associated; rec_Catalog Size field 418 which specifies the size of the instant grid (detail) catalog; and rec_Catalog Ref field 421 which provides an offset address for locating the instant grid (detail) catalog in Group Data field 424. The latter includes the content of each grid (detail) catalog identified in group catalog 400.

Figure 6:
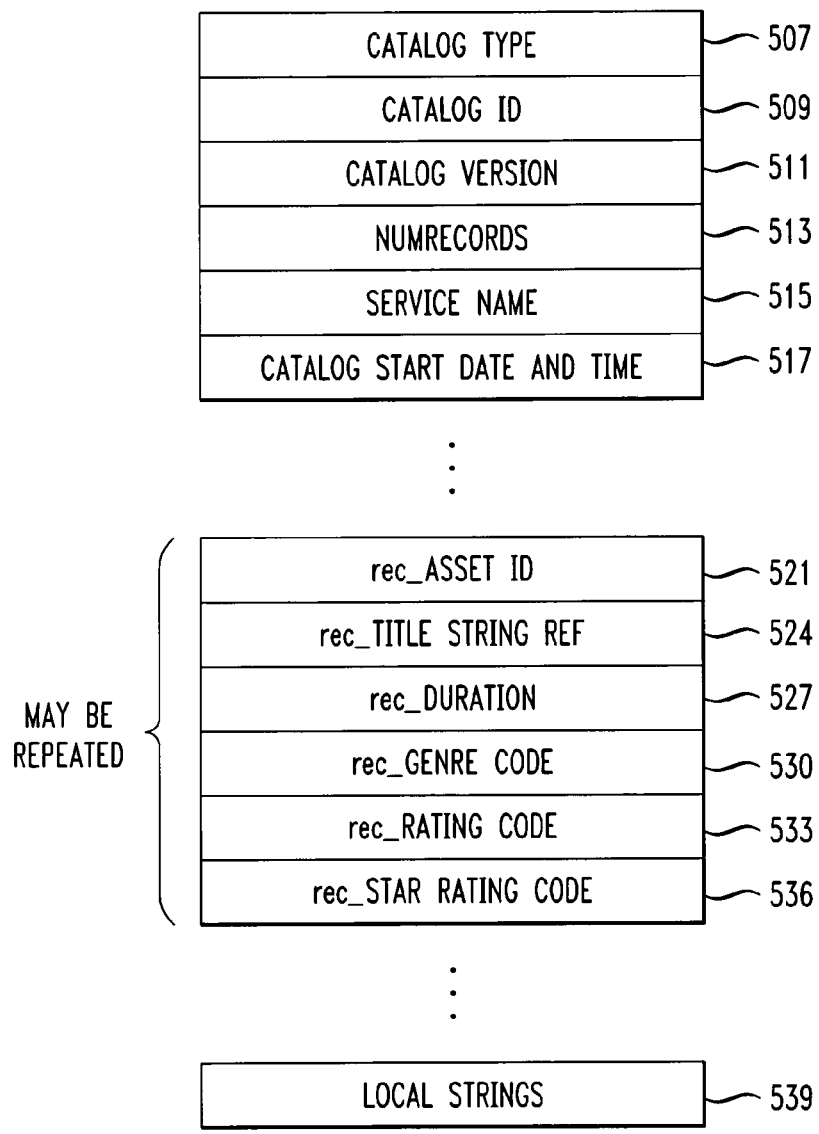
FIG. 6 illustrates a data structure of grid catalog containing program guide and related data.

FIG. 6 illustrates the data structure of a generic grid catalog, denoted 500. Grid catalog 500 includes, e.g., Catalog Type field 507 which contains an identifier indicating that the instant catalog is of grid catalog type; Catalog ID field 509 which, together with Catalog Type field 507, uniquely identifies the instant catalog in the system; Catalog Version field 511 which contains a version number of the instant catalog, which is incremented for each published change to the catalog; NumRecords field 513 which contains the number of records concerning, e.g., broadcast programs, in the instant catalog; Service Name field 515 which identifies the program channel, e.g., HBO, with which the programs are associated; and Catalog Start Date and Time field 517 which contains the start date and time of the instant catalog, which in this instance corresponds to the start of the first program in the catalog. In addition, for each program, catalog 500 includes rec_Asset ID field 521 which contains a unique identifier of the program in the system; rec_Title String Ref field 524 which provides a reference to a character string representing the title of the program in either Local Strings field 539 or a global string table described below; rec_Duration field 527 which specifies the duration of the program in minutes; rec_Genre Code field 530 which contains a code identifying the genre of the program, e.g., action, romance, history, etc.; rec_Rating Code field 533 which specifies an MPAA or TV rating of the program content, e.g., G, PG, TV-14, R, etc.; and rec_Star Rating Code field 536 which specifies the rating of the program content by critics in terms of the number of stars, which may range from half a star (bad) to four stars (excellent).

Local Strings field 539 contains strings of characters each identifiable by a local string reference. The use of local string references, in accordance with an aspect of the invention, allows a catalog to consolidate variable length string data into a single block, e.g., field 539, in the same catalog. Advantageously, identical strings used in the same catalog are referenced by the same string reference, and the string reference bit length typically is shorter than that of the underlying string. Thus, among other advantages, transmission of a catalog having repeated string references, rather than repeated strings, saves bandwidth for transmission of the catalog.

In accordance with a further aspect of the invention, the use of string references is extended beyond the catalog level to more effectively utilize the limited transmission bandwidth. If a string is frequently used and common to different catalogs, such a string is collected in a global string table. A global string reference for locating the string in the global string table may be used by different catalogs to reference the same string. Thus, a string reference here may refer to a local string collected in a local string data block, e.g., field 539, or a global string collected in another catalog. For example, the title string reference in aforementioned field 524 may reference a local string or global string. In this illustrative embodiment, if the most significant bit (MSB) of the string reference is "0," it indicates that the string reference refers to a local string. On the other hand, if the MSB of the string reference is "1," it indicates that the string reference refers to a global string.

Figure 7:
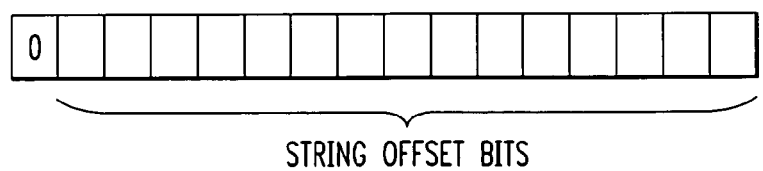
FIG. 7 illustrates a data format of a local string reference.

FIG. 7 illustrates the format of a generic local string reference, denoted 600. As shown in FIG. 7, local string reference 600 is 16 bits long with the MSB="0." The remaining 15 bits (referred to as the "string offset bits") make possible 32,768 bytes of addressable space containing local strings in a local string data block.

Figure 8:
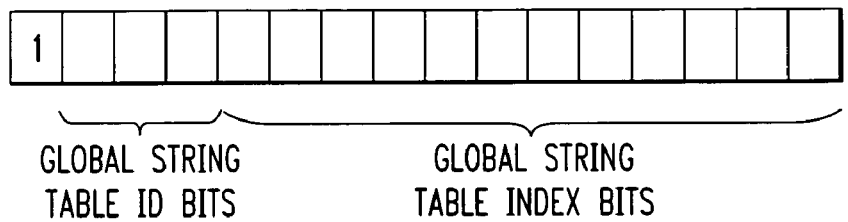
FIG. 8 illustrates a data format of a global string reference.

FIG. 8 illustrates the format of a generic global string reference, denoted 700. As shown in FIG. 8, reference 700 has the MSB="1." The following 3 bits (referred to as the "global string table ID bits") define a global string table ID, thereby allowing 8 addressable global string tables. In this instance, these 8 tables are equally divided into first and second groups, which take turns being readable to provide referenced global strings, and being updated, in accordance with a "ping pong" approach. That is, the first group is made readable while the second group is being revised to become an updated version of the first group, and vice versa. The remaining 12 bits (referred to as the "global string table index bits") define an index for locating the referenced global string using the identified global string table. Let's say reference 700 has a binary value "1101000101100001" in this instance. The fact that its MSB="1," as opposed to "0," indicates that reference 700 is a global strings reference. The following 3 bits "101" define a global string table with a catalog ID="5 (decimal)." The remaining 12 bits "000101100001" define the $353^{rd}$ index into the identified global string table for locating the referenced global string.

Figure 9:
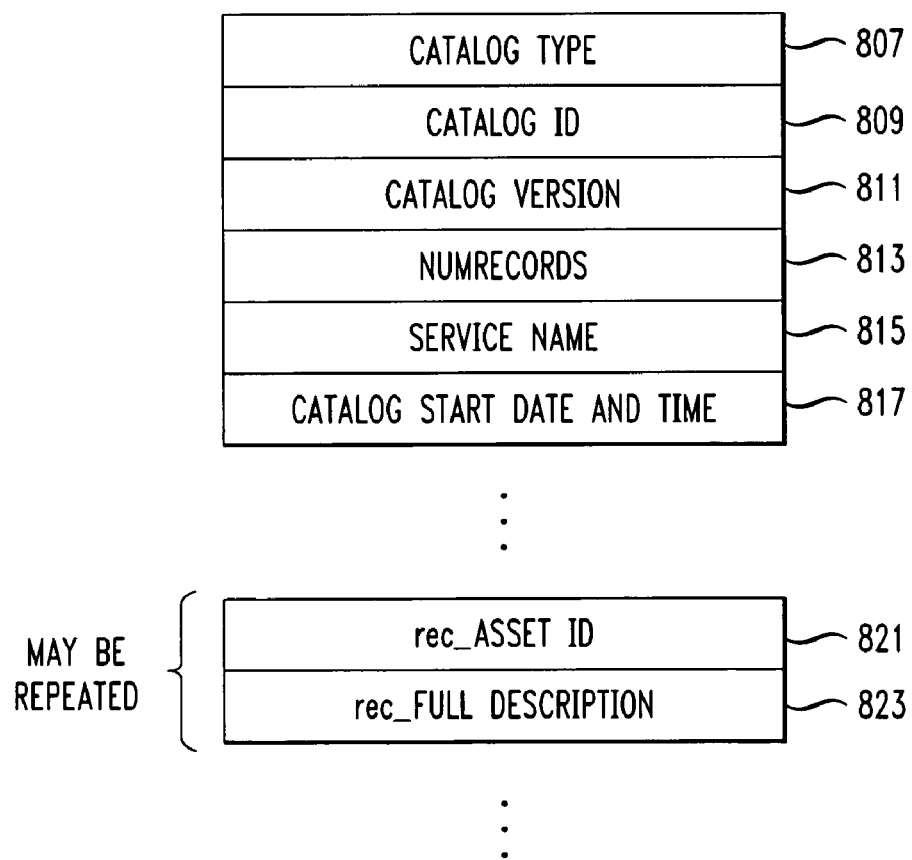
FIG. 9 illustrates a data structure of a detail catalog containing program guide and related data.

FIG. 9 illustrates the data structure of a generic detail catalog, denoted 800. Detail catalog 800 includes, e.g., Catalog Type field 807 which contains an identifier indicating that the instant catalog is of detail catalog type; Catalog ID field 809 which, together with Catalog Type field 807, uniquely identifies the instant catalog in the system; Catalog Version field 811 which contains a version number of the instant catalog, which is incremented for each published change to the catalog; NumRecords field 813 which contains the number of records concerning, e.g., broadcast programs, in the instant catalog; Service Name field 815 which identifies the program channel with which the programs are associated; and Catalog Start Date and Time field 817 which contains the start date and time of the instant catalog, which in this instance corresponds to the start of the first program in the catalog. In addition, for each program, catalog 800 includes rec_Asset ID field 821 which contains a unique identifier of the program in the system; and rec_Full Description field 823 which provides a synopsis of the program content.

FIG. 10 illustrates a sample program guide, denoted 900, whose content is jointly contributed by a grid catalog, e.g., grid catalog 500, and the corresponding detail catalog, e.g., detail catalog 800. In this instance, program channel 903, e.g., HBO, is identified by both Service Name fields 515 and 815 in catalogs 500 and 800, respectively. The start date and time 905 of the first program in guide 900 is identified by both Catalog Start Date and Time fields 517 and 817 in catalogs 500 and 800, respectively. The title 907 of the program is derived from rec_Title String Ref field 524 of the record in grid catalog 500 corresponding to the first program. The synopsis 911 of the program is derived from rec_Full Description field 823 of the record in detail catalog 800 corresponding to the first program. The duration 913 of the program is specified by rec_Duration field 527 of the record in grid catalog 500 corresponding to the first program. The advisory rating 915 of the program is specified by rec_Rating Code field 533 of the record in grid catalog 500 corresponding to the first program. The title, synopsis, duration and advisory rating of every other program in guide 900 are similarly derived from the respective fields of the records in catalogs 500 and 800 corresponding to the program.

It should be pointed out that with the knowledge of the start date and time 905 of the first program and the duration 913 thereof, the date and start time 917 of the second program is readily derived by adding duration 913 to the start date and time 905, which derivation is performed by processor 204 in set-top terminal 200. The start dates and times of subsequent programs are similarly derived.

It should be noted that the above examples are in the context of a broadcast service. However, the invention may be applied not only to a broadcast service, but also other services such as VOD services, which include MOD, subscription VOD, pay per view (PPV) services, etc. In order to fully appreciate the invention in the context of a VOD service, two on demand catalogs, namely, an on-demand menu catalog and on-demand selection catalog will now be described.

Figure 11:
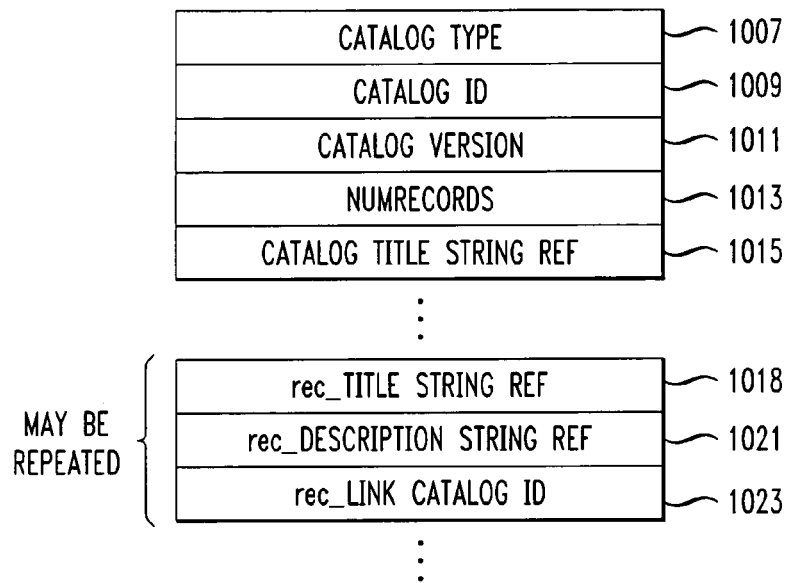
FIG. 11 illustrates a data structure of an on-demand menu catalog.

FIG. 11 illustrates the data structure of a generic on-demand menu catalog, denoted 1000. Menu catalog 1000 includes, e.g., Catalog Type field 1007 which contains an identifier indicating that the instant catalog is of on-demand menu catalog type; Catalog ID field 1009 which, together with Catalog Type field 1007, uniquely identifies the instant catalog in the system; Catalog Version field 1011 which contains a version number of the instant catalog, which is incremented for each published change to the catalog; NumRecords field 1013 which contains the number of records concerning menu selections in the instant catalog; and Catalog Title String Ref field 1015 which provides a string reference to the title of the on-demand menu.

For each menu selection record, catalog 1000 also includes, e.g., rec_Title String Ref field 1018 which provides a string reference to the title of the menu selection; rec_Description String Ref field 1021 which provides a string reference to a description of the selection; and rec_Link Catalog ID field 1023 for specifying a catalog ID identifying another catalog to which the instant record is linked or pointed, in a manner described below.

Figure 12:
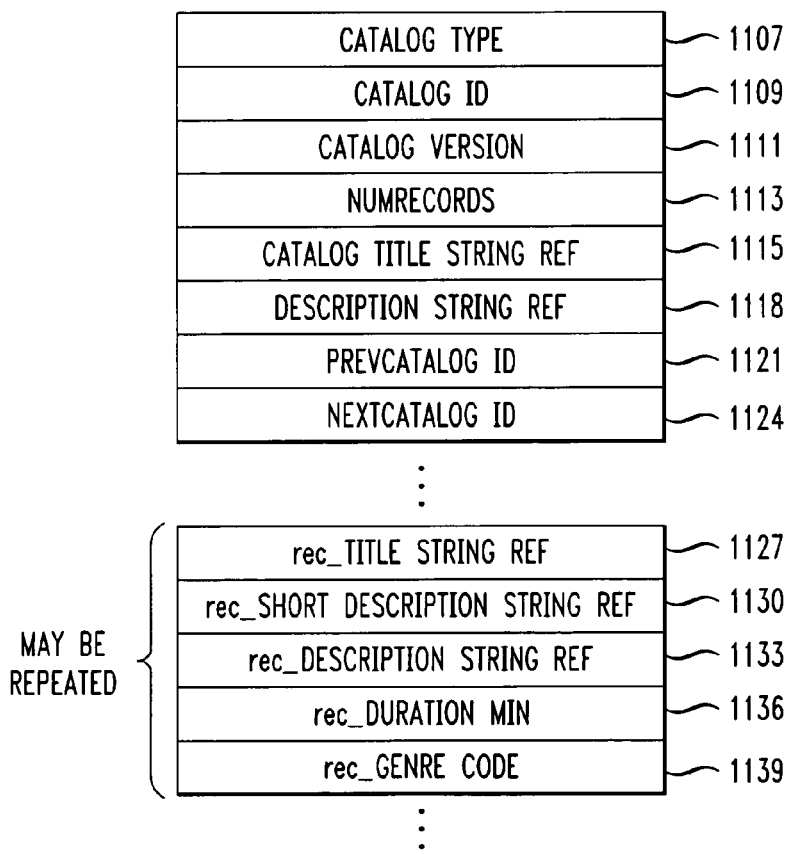
FIG. 12 illustrates a data structure of an on-demand selection catalog.

FIG. 12 illustrates the data structure of a generic on-demand selection catalog, denoted 1100. Selection catalog 1100 includes, e.g., Catalog Type field 1107 which contains an identifier indicating that the instant catalog is of on-demand selection catalog type; Catalog ID field 1109 which, together with Catalog Type field 1107, uniquely identifies the instant catalog in the system; Catalog Version field 1111 which contains a version number of the instant catalog, which is incremented for each published change to the catalog; NumRecords field 1113 which contains the number of records concerning, e.g., on-demand programs or events, in the instant catalog; Catalog Title String Ref field 1115 which provides a string reference to the title of the instant selection; Description String Ref field 1118 which provides a string reference to a description of the selection; PrevCatalog ID field 1121 identifies any on-demand selection catalog from which the instant catalog continues; and NextCatalog ID field 1124 identifies any on-demand selection catalog continuing from the instant catalog. As apparent from the disclosure hereinbelow, the PrevCatalog and NextCatalog IDs help segment large catalogs for better network performance.

For each on-demand program record, catalog 1100 also includes, e.g., rec_Title String Ref field 1127 which provides a string reference to the title of the program; rec_Short Description String Ref field 1130 which provides a string reference to a short description of the program; rec_Description String Ref field 1133 which provides a detailed description of the program; rec_Duration Min field 1136 which provides the duration of the program in minutes; and rec_Genre Code field 1139 which contains a code identifying the genre of the program, e.g., action, romance, history, etc.

Figure 13:
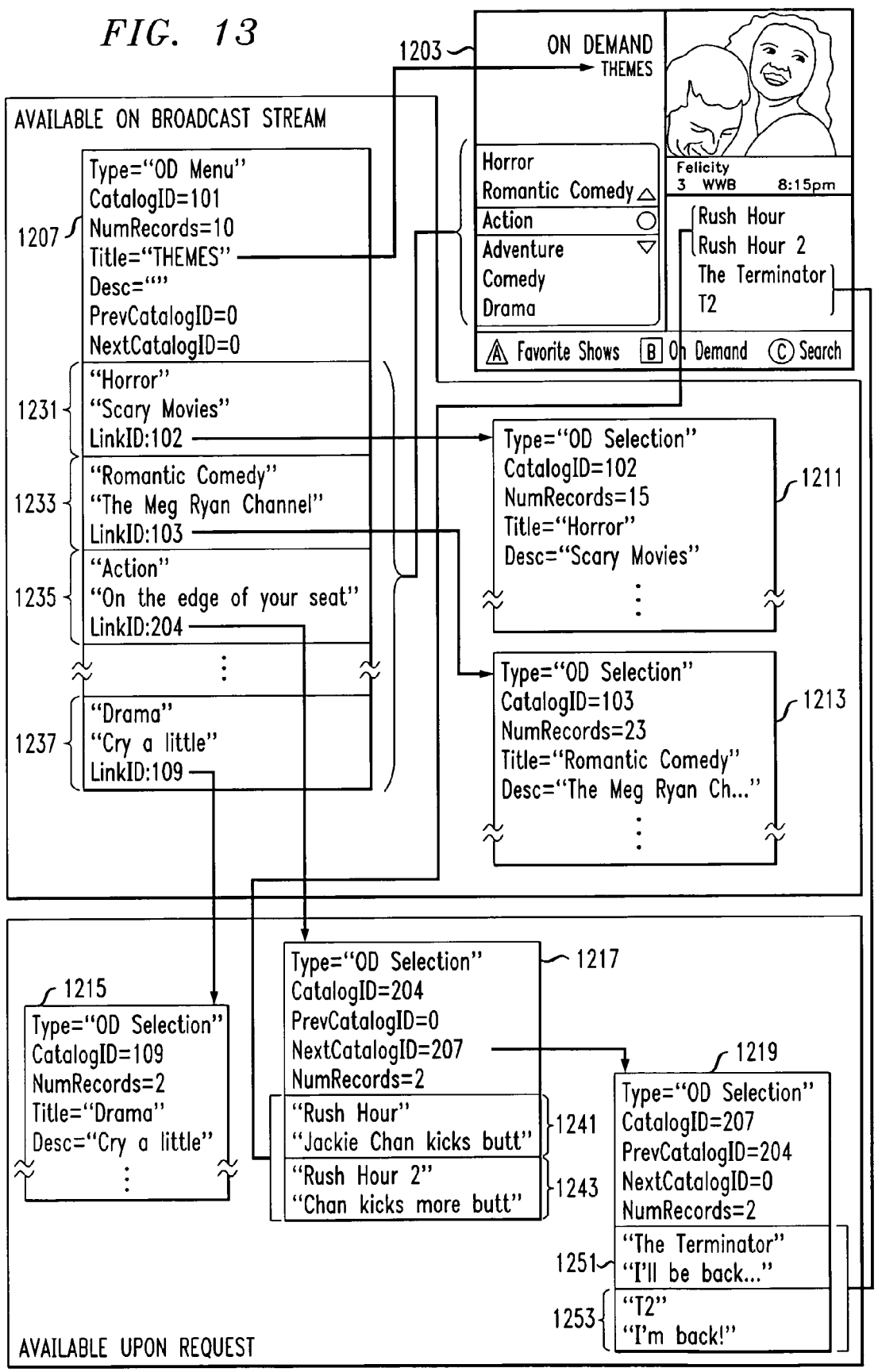
FIG. 13 illustrates a sample on-demand menu.

FIG. 13 illustrates sample on-demand menu 1203 whose content is jointly contributed by on-demand menu catalog 1207 and multiple on-demand selection catalogs, denoted 1211, 1213, 1215, 1217 and 1219, respectively. For example, the title of menu 1203, i.e., "Themes," is derived from the data in the Catalog Title String Ref field of menu catalog 1207; each selection in menu 1203, i.e., "Horror," "Romantic Comedy," "Action," . . . and "Drama," are derived from the data in selection records 1231, 1233, 1235, . . . and 1237 in catalog 1207, respectively. More specifically, the rec_Title String Ref field of record 1231 provides the data for the title of the menu selection "Horror;" the rec_Description String Ref field of record 1231 provides the data for the description of the selection "Scary Movies;" and the rec_Link Catalog ID field of record 1231 specifies catalog ID "102" to which record 1231 is linked. In this instance, on-demand selection catalog 1211 has a catalog ID="102," which provides information concerning 15 individual on-demand programs under the "Horror" selection.

Similarly, the rec_Title String Ref field of record 1235 provides the data for the title of the menu selection "Action," which in this instance is selected on menu 1203 (shown highlighted). In addition, the rec_Link Catalog ID field of record 1235 specifies catalog ID "204" to which record 1235 is linked. In this instance, on-demand selection catalog 1217 has a catalog ID="204," which provides, among others, the titles of the programs available for the "Action" selection, e.g., "Rush Hour," and "Rush Hour 2," which are derived from program records 1241 and 1243 in catalog 1217, respectively. More specifically, for example, the rec_Title String Ref field of program record 1241 provides the data for the title "Rush Hour," and that of program record 1243 provides the data for the title "Rush Hour 2."

It should be noted that the NextCatalog ID field of selection catalog 1217 in this instance has a pointer value other than "0" representing "NULL," e.g., "207," indicating that catalog ID "207" continues from catalog 1217. In this example, on-demand selection catalog 1219 has a catalog ID="207," and at the same time it has in the PrevCatalog ID field a pointer value "204," referencing catalog 1217 having a catalog ID="204" from which it continues. Unlike catalog 1217, catalog 1219 has a "0" value in its NextCatalog ID field, indicating that no catalog continues from catalog 1219. Catalog 1219 provides, among others, additional titles of the programs available for the "Action" selection, e.g., "The Terminator," and "T2," which are derived from program records 1251 and 1253 in catalog 1219, respectively. More specifically, for example, the rec_Title String Ref field of program record 1251 provides the data for the title "The Terminator," and that of program record 1253 provides the data for the title "T2."

It should be noted that some of the catalogs in FIG. 13, e.g., catalogs 1211 and 1213, are automatically made available on the BFS broadcast stream and may have been cached in set-top terminal 200, stemming from this example where the "Horror" selection associated with catalog 1211 and the "Romantic Comedy" selection associated with catalog 1213 are popular choices among users. On the other hand, the other catalogs in FIG. 13, e.g., catalogs 1217 and 1219, are furnished upon request therefor, stemming from this instance where the "Action" selection associated with catalogs 1217 and 1219 is a less popular choice.

Figure 14:
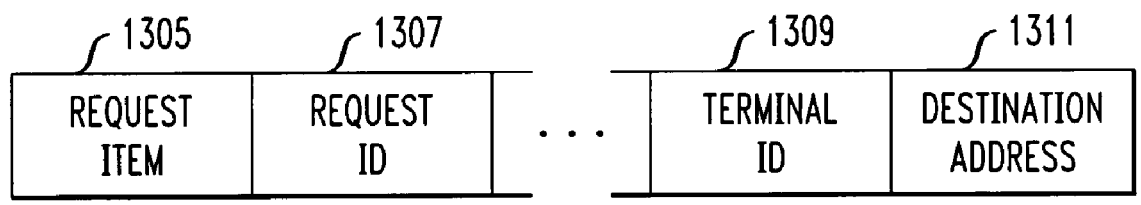
FIG. 14 illustrates a request for a catalog from a set-top terminal.

FIG. 14 illustrates a generic request (denoted 1301) by set-top terminal 200 to guide data server 109 for a certain catalog which is needed by terminal 200 and not cached in memory 202. As shown in FIG. 13, request 1301 includes, e.g., Request Item field 1305 which contains data specifying the desired catalog; Request ID field 1307 which contains a reference to the instant request, which will be echoed back in the response by server 109; Terminal ID field 1309 which contains data identifying requesting terminal 200, which may be its IP address (or MAC address); and Destination Address field 1311 contains an IP (or MAC) address of network controller 113 to which the instant request is destined. Processor 204 generates request 1301, and causes it to be transmitted through interface 206 to headend 105 via an RDC.

Based on the destination address in field 1311 of request 1301, the request is received by network controller 113. After reading request 1311, controller 113 identifies an available FDC for communicating a response to the request. In addition, network controller 113 communicates to guide data server 109 the identity of the requested catalog from field 1305, identity of the available FDC, request ID from field 1307, and IP (and/or MAC) address of requesting terminal 200 from field 1309. In response, server 109 provides a data stream containing the request ID, the requesting terminal address, and the requested catalog to switching unit 115. In addition, server 109 causes switching unit 115 to switch the data stream to the appropriate QPSK modem in pool 127 corresponding to the identified FDC. Accordingly, the data stream is modulated onto the FDC, and routed to requesting terminal 200 having the identified address. Upon receiving the data stream, processor 204 extracts therefrom the requested catalog, and request ID for associating the received catalog with its earlier request.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the BFS broadcast stream carrying guide data related catalogs traverses an out-of-band channel. It will be appreciated that an inband channel may be used for transmission of such a broadcast stream as long as it does not interfere with delivery of programming content through the same inband channel to a set-top terminal.

In addition, data in the above-described catalogs is preferably compressed using a conventional data compression technique before its transmission to more efficiently utilize the limited network bandwidth.

Further, in the disclosed embodiment, a BFS data carousel mechanism is illustratively used to transport data catalogs to set-top terminals. However, it will be appreciated that a person skilled in the art may use other carousel mechanisms to achieve the similar function, which include, e.g., a well known OCAP object (data) carousel mechanism, DSM-CC object (data) carousel mechanism, MHP object (data) carousel mechanism, etc.

Finally, the broadband communications system of FIG. 1 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. Apparatus for providing information concerning at least one program delivered through a communications network, the apparatus comprising:

an interface for receiving over the communications network a data object containing the information, the data object including a string reference providing information on the location of a string descriptive of the program, the string reference including a value in a predetermined location indicating whether the string is located within the data object or is located within a global string table external to the data object, said global string table including strings which can be referenced by a plurality of different data objects;

a processor for determining based on the value at the predetermined location whether the string reference indicates that the string is located within the data object or in the global string table; and wherein, when said value in the string reference indicates that the string is located within the data object, the string reference also includes a set of bits indicating a position of the string descriptive of said program in a block of local strings located within the data object.

2. The apparatus according to claim 1, wherein the string reference is repeated within the data object multiple times.

3. The apparatus according to claim 1, wherein the value in the predetermined location includes a single bit used to indicate if the string is located within the data object or that the string is located within the global string table external to the data object.

4. The apparatus according to claim 1,
wherein the string is a text string providing a title of the program; and
wherein said data object includes multiple text strings, said string being one of said multiple text strings when said value indicates that the string is located within the data object.

5. The apparatus according to claim 1, further comprising: a set-top terminal; and
wherein the information includes program guide data.

6. The apparatus according to claim 1, wherein data in the data object is compressed.

7. A method for providing information concerning at least one program delivered through a communications network, the method comprising:
receiving over the communications network a data object containing the information, the data object including a string reference providing information on the location of a string descriptive of the program, the string reference including a value in a predetermined location indicating whether the string is located within the data object or within a global string table external to the data object, said global string table including strings which can be referenced by a plurality of different data objects;
using a processor to determine based on the value at the predetermined location whether the string reference indicates that the string is located within the data object or in the global string table; and
wherein, when said value in the string reference, indicates that the string is located within the data object, the string reference also includes a set of bits indicating a position of the string descriptive of said program in a block of local strings located within the data object.

8. The method according to claim 7, wherein the string reference is repeated within the data object.

9. The method according to claim 7, wherein the value in the predetermined location that includes a single bit used to indicate if the string is located within the data object or that the string is located within the global string table external to the data object.

10. The method according to claim 7, wherein the string is a text string providing a title of the program.

11. The method according to claim 7, wherein at least part of the string reference defines a location of the string.

12. The method according to claim 7, wherein the information includes program guide data.

13. The method according to claim 7, wherein data in the data object is compressed.

14. The method of claim 7, wherein said string reference includes string offset bits indicating where within the block of local strings the string descriptive of said program begins.

15. The method of claim 7, wherein said string reference indicates the location of said string descriptive of said program in the global string table when said string reference indicates the string is located in the global string table external to said data object.

16. The method of claim 15 wherein said different data objects are different catalogs of program information.

17. The method of claim 15, wherein said data object is a catalog including program guide data.

18. The method of claim 17, wherein said string is a text string indicating the title of a program.

* * * * *